(12) United States Patent
Mordani et al.

(10) Patent No.: US 10,439,909 B2
(45) Date of Patent: Oct. 8, 2019

(54) PERFORMANCE MONITORING IN A MULTI-SITE ENVIRONMENT

(71) Applicant: CISCO TECHNOLOGY, INC., San Jose, CA (US)

(72) Inventors: Preety Mordani, Sunnyvale, CA (US); Rahul Patel, Fremont, CA (US); Yoshiyuki Tsuda, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 892 days.

(21) Appl. No.: 14/472,194

(22) Filed: Aug. 28, 2014

(65) Prior Publication Data

US 2015/0333999 A1   Nov. 19, 2015

Related U.S. Application Data

(60) Provisional application No. 61/994,536, filed on May 16, 2014.

(51) Int. Cl.
| | |
|---|---|
| *G06F 15/16* | (2006.01) |
| *G06F 15/173* | (2006.01) |
| *H04L 12/26* | (2006.01) |
| *H04L 29/06* | (2006.01) |
| *H04L 12/24* | (2006.01) |

(52) U.S. Cl.
CPC .......... *H04L 43/08* (2013.01); *H04L 41/0681* (2013.01); *H04L 43/062* (2013.01); *H04L 43/0805* (2013.01); *H04L 43/16* (2013.01); *H04L 65/4069* (2013.01); *H04L 65/601* (2013.01)

(58) Field of Classification Search
CPC ..... H04L 43/08; H04L 43/0805; H04L 43/16; H04L 43/062; H04L 41/0681; H04L 65/4069; H04L 65/601
USPC ........................................................ 709/224
See application file for complete search history.

(56) References Cited

U.S. PATENT DOCUMENTS

| | | | |
|---|---|---|---|
| 6,704,303 B1 * | 3/2004 | Bowman-Amuah | H04L 12/6418 370/352 |
| 6,707,812 B1 * | 3/2004 | Bowman-Amuah | H04L 12/1813 370/351 |
| 7,222,190 B2 * | 5/2007 | Klinker | H04L 29/06 370/235 |
| 7,561,517 B2 * | 7/2009 | Klinker | H04L 29/06 370/229 |
| 7,684,321 B2 * | 3/2010 | Muirhead | H04L 12/4641 370/230 |
| 7,706,291 B2 | 4/2010 | Luft et al. | |
| 7,908,359 B1 | 3/2011 | Soph | |

(Continued)

*Primary Examiner* — Kristie D Shingles
(74) *Attorney, Agent, or Firm* — Cindy Kaplan (57) ABSTRACT

In one embodiment, a method includes monitoring traffic at a network device at a receiving network site to determine if a performance threshold is violated, transmitting an alert to a sending network site if the performance threshold is violated at a path at the network device, and transmitting traffic information for the path from the network device to the sending network site. The receiving network site comprises a plurality of paths for receiving traffic from the sending network site and traffic information is transmitted to the sending network site for each of the paths if the performance threshold is violated. An apparatus and logic are also disclosed herein.

18 Claims, 4 Drawing Sheets

(56) References Cited

U.S. PATENT DOCUMENTS

| | | | |
|---|---|---|---|
| 8,032,409 B1* | 10/2011 | Mikurak | G06Q 10/00 |
| | | | 705/14.39 |
| 8,310,947 B2* | 11/2012 | Hwang | H04W 48/02 |
| | | | 342/368 |
| 2002/0145981 A1* | 10/2002 | Klinker | H04L 41/0816 |
| | | | 370/244 |
| 2005/0010660 A1 | 1/2005 | Vaught | |
| 2005/0073402 A1 | 4/2005 | Denyer et al. | |
| 2007/0022313 A1 | 1/2007 | Mackey et al. | |
| 2008/0019286 A1 | 1/2008 | Wurst et al. | |
| 2008/0052387 A1 | 2/2008 | Heinz | |
| 2008/0052394 A1 | 2/2008 | Bugenhagen | |
| 2008/0250356 A1* | 10/2008 | Johns | G06F 3/04815 |
| | | | 715/853 |
| 2011/0314145 A1* | 12/2011 | Raleigh | H04L 41/0893 |
| | | | 709/224 |
| 2012/0221955 A1* | 8/2012 | Raleigh | H04M 15/00 |
| | | | 715/736 |
| 2013/0054784 A1 | 2/2013 | Yadav | |
| 2014/0140213 A1* | 5/2014 | Raleigh | H04L 67/2804 |
| | | | 370/235 |
| 2015/0103662 A1* | 4/2015 | Valero | H04L 47/2441 |
| | | | 370/235 |

* cited by examiner

PERFORMANCE MONITORING IN A MULTI-SITE ENVIRONMENT

STATEMENT OF RELATED APPLICATION

The present application claims priority from U.S. Provisional Application No. 61/994,536, entitled THRESHOLD CROSSING ALERTS AND ON-DEMAND EXPORTS, filed on May 16, 2014. The contents of this provisional application are incorporated herein by reference in its entirety.

TECHNICAL FIELD

The present disclosure relates generally to communication networks, and more particularly, to monitoring network performance.

BACKGROUND

In enterprise and other networks, it is important to monitor application performance so that action can be taken if performance degradation occurs.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises monitoring traffic at a network device at a receiving network site to determine if a performance threshold is violated, transmitting an alert to a sending network site if the performance threshold is violated at a path at the network device, and transmitting traffic information for the path from the network device to the sending network site. The receiving network site comprises a plurality of paths for receiving traffic from the sending network site and the traffic information is transmitted to the sending network site for the plurality of paths if the performance threshold is violated.

In another embodiment, a method generally comprises receiving at a network device in a sending network site, an alert that a performance threshold has been violated at a path at a receiving network site, receiving at the network device, traffic information for a plurality of paths at the receiving network site, and processing the alert and traffic information to determine if traffic transmitted to the path should be moved to an alternate path.

In yet another embodiment, an apparatus generally comprises a processor for monitoring traffic at a receiving network site to determine if a performance threshold is violated, transmitting an alert to a sending network site if the performance threshold is violated, and transmitting traffic information for the receiving network site to the sending network site. The apparatus further comprises memory for storing the traffic information. The receiving network site comprises a plurality of paths for receiving traffic from the sending network site. The traffic information is transmitted to the sending network site for the plurality of paths if the performance threshold is violated.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a dynamic network with varying traffic conditions, static policy configurations are not sufficient to cater to the changing demands of the network. An enterprise network, for example, should monitor application performance and take corrective action as needed based on feedback from the network. Information technology managers are constantly being challenged to provide a certain user experience for critical applications while maintaining application service level agreements (SLAs).

The embodiments described herein provide a scalable and distributed approach to monitor network performance in a multi-site environment. One or more embodiments provide an effective and scalable way to transmit performance violation alerts to a source. The embodiments may be used, for example, to notify the source sending traffic of performance violations so that the sender can take corrective action. One or more embodiments may also be used to send performance measurements for alternate paths on an as needed basis. The performance measurements may be used by the sender to make an informed decision as to what, if any, corrective action should be taken.

As described below, one or more embodiments may provide scalability along with the flexibility of receiving measurements and violation alerts on a per-DSCP (Differentiated Services Code Point) basis. Scalability may be provided by passively measuring performance measurements on a receiving site and only informing the sender of performance violations. This allows the sending network site to assume that it is utilizing the best link until the receiver informs the sending site of a violation. Simultaneous receipt of alerts and performance measurements for alternate paths is beneficial to the sending network site for use in determining corrective action.

Figure 1:
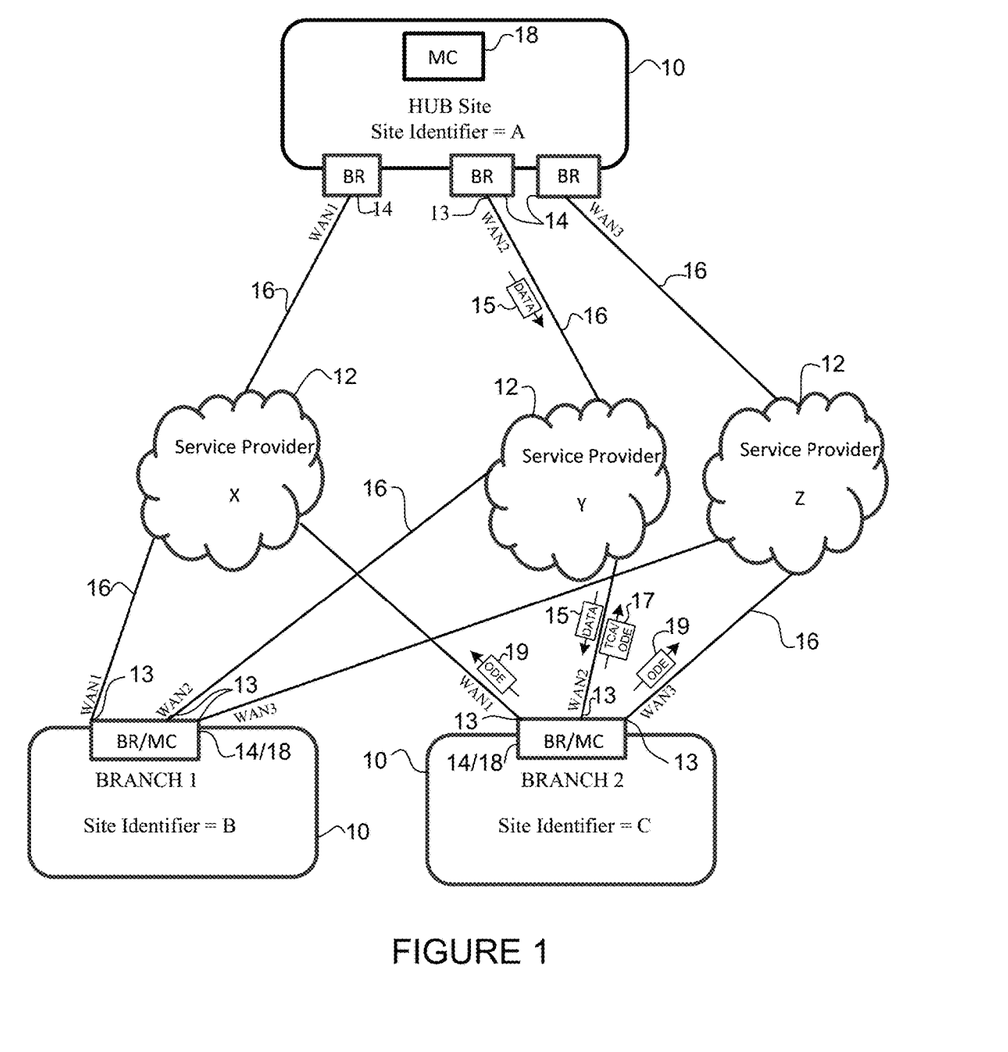
FIG. 1 illustrates an example of a network in which embodiments described herein may be implemented.

Referring now to the drawings, and first to FIG. 1, a network in which embodiments described herein may be implemented is shown. The embodiments operate in the context of a data communication network including multiple network devices. For simplification, only a small number of nodes are shown. The network may include any number of network devices in communication via any number of nodes (e.g., routers, switches, or other network devices), which facilitate passage of data within the network.

The network includes a plurality of interconnected network sites. In the example shown in FIG. 1, network sites 10 (A, B, and C) communicate over a plurality of WANs (Wide Area Networks) (WAN1, WAN2, WAN3). Communication between the network sites 10 may be provided via any number of networks 12 (e.g., service provider networks X, Y, Z).

In one example, an enterprise includes a hub site and two branch sites (branch 1 and branch 2). Each network site 10 may be associated with a unique site identifier. In the example shown in FIG. 1, the hub is associated with site identifier (ID) A, branch 1 is associated with site identifier B, and branch 2 is associated with site identifier C. The site identifier may be pre-defined and assigned by a network administrator, for example.

The network shown in the example of FIG. 1 includes a plurality of routers 14 connected by links 16. The term 'router' as used herein may refer to any network device (e.g., router, switch/router) configured to perform routing functions. In the example shown in FIG. 1, each network site 10 includes one or more border routers 14, which may comprise, for example, a customer edge router. The links 16 may traverse one or more networks (e.g., wide area network, local area network, metropolitan area network, wireless network, virtual private network, enterprise network, Internet, intranet, radio access network, public switched network, or any other type of network). The data paths between the network sites 10 may include any number or type of network devices (e.g., routers, switches, gateways).

Traffic may pass into and out of the network sites 10 via the border routers 14. Each site 10 may have one or more border routers 14 located in the data path with interfaces (paths) 13 (e.g., WAN interfaces) connecting the site to the service provider clouds 12. The border routers 14 may each comprise one or more interfaces 13. For example, at network site A in FIG. 1, each border router 14 is connected to one WAN interface 13. At network sites B and C, each border router 14 is connected to three WAN interfaces (WAN1, WAN2, WAN3).

Each network site 10 may include one or more controllers 18 (referred to herein as a master controller (MC)). The master controller 18 may be a standalone device (e.g., as shown at network site A in FIG. 1) or coupled with the border router 14 (e.g., as shown at network sites B and C in FIG. 1). The master controller 18 may or may not be in the data path and may be referred to as the 'brain' of the network site. In one embodiment, the master controllers 18 may be responsible (e.g., solely responsible) for processing statistics and metrics that are collected and using configured policies to make calculated rerouting decisions. The border routers 14 may be responsible for executing a reroute decision made by the master controller 18.

As described in detail below, the border routers 14 monitor traffic received at their interfaces 13 and destined for their network site 10. The monitoring may be used, for example, to determine the performance of an application. If one or more performance measurements fall outside of a predefined threshold (e.g., above, below, outside of range), the border router 14 may raise an alert (referred to herein as a Threshold Crossing Alert (TCA)). In one embodiment, the TCA is transmitted to the sender site's master controller 18 to inform the sender of the violation so that the sender may take appropriate corrective action. The threshold values may be configured, for example, at the MC 18 at the hub and pushed down to the other site MCs. The thresholds may be defined for one or more performance metric, including for example, packet loss rate, delay, jitter, byte loss rate, or any other metric or performance measurement, or combination thereof In addition to receiving the TCA at the sender site 10, it may be beneficial to receive comprehensive performance measurements for not only the path (e.g., interface) that detected the performance violation, but also for alternate paths. Pull of performance measurements for the path is referred to herein as On Demand Export (ODE). In one embodiment, the pull of performance measurements is only done when an alert is received for a particular monitor interval (i.e., on-demand). As described below, the metrics may be pulled, for example, for a particular WAN interface, DSCP, and site identifier combination. The sending site 10 may then use both the TCA for the path that had the performance violation and the ODEs for all of the paths including the one that raised the TCA, to make an intelligent decision as to whether or not traffic should be rerouted, rather than assuming that the alternative path is a better choice and blindly moving the traffic to that link. The combination of the alert and traffic information provides an effective mechanism for use by the sending network site 10 in identifying performance degradation and making informed decisions to mitigate against performance violations.

The following provides an example of a call (e.g., telepresence call) initiated at network site A and directed towards network site C in FIG. 1. In this example, the user has defined a specific policy where the tolerance for the application is defined by a packet loss ≤2%. The performance of the call may be measured at the receiving site (e.g., site C monitoring data packets 15). If performance monitoring identifies a packet loss greater than 2% for the application, it is classified as a threshold violation, which results in the raising of an alert (e.g., TCA packet 17 in FIG. 1). The TCA is sent to the sender site's master controller 18 to inform the sender of the violation so that the sender may take appropriate corrective action. As described below, the TCA packet 17 may also include ODE information.

In the example described above and shown in FIG. 1, the call traversed one WAN interface 13 (WAN2) and service provider cloud 12 (Y). Once the TCA is raised, the violated thresholds are known via that alert. The BR 14 at network site C may also transmit ODE information for alternate WAN interfaces (WAN1, WAN3) (packets 19 in FIG. 1). With information available from both the TCA and ODE packets for all of the available paths, the sending site (site A) can make an intelligent choice between the available paths, as opposed to assuming that the alternate path is functioning properly and putting the traffic on that link, without knowing the status of the link. ODE information from each interface (path) 13 at the receiving site 10 may be used in deciding what, if any, corrective action should be taken. Corrective action may include, for example, rerouting the call if performance is better at one of the alternate paths (WAN1 or WAN3) or leaving traffic on the current link and continuing to monitor to see if performance continues to deteriorate, if performance is the same on all paths.

In the example described above, network site A is the sending site and network site C is the receiving site. It is to be understood that any of the network sites, including sites B and C, may be the sending network site and any of the network sites, including site A, may be the receiving network site.

Data, TCA, or ODE packets 15, 17, 19 may be communicated by the border routers 14 using network communication protocols such as User Datagram Protocol (UDP), Transmission Control Protocol (TCP)/Internet Protocol (IP), or any other suitable protocol.

It is to be understood that the network shown in FIG. 1 and described above is only an example and the embodiments described herein may be implemented in networks comprising different network topologies or network devices or using different network protocols, without departing from the scope of the embodiments.

Figure 2:
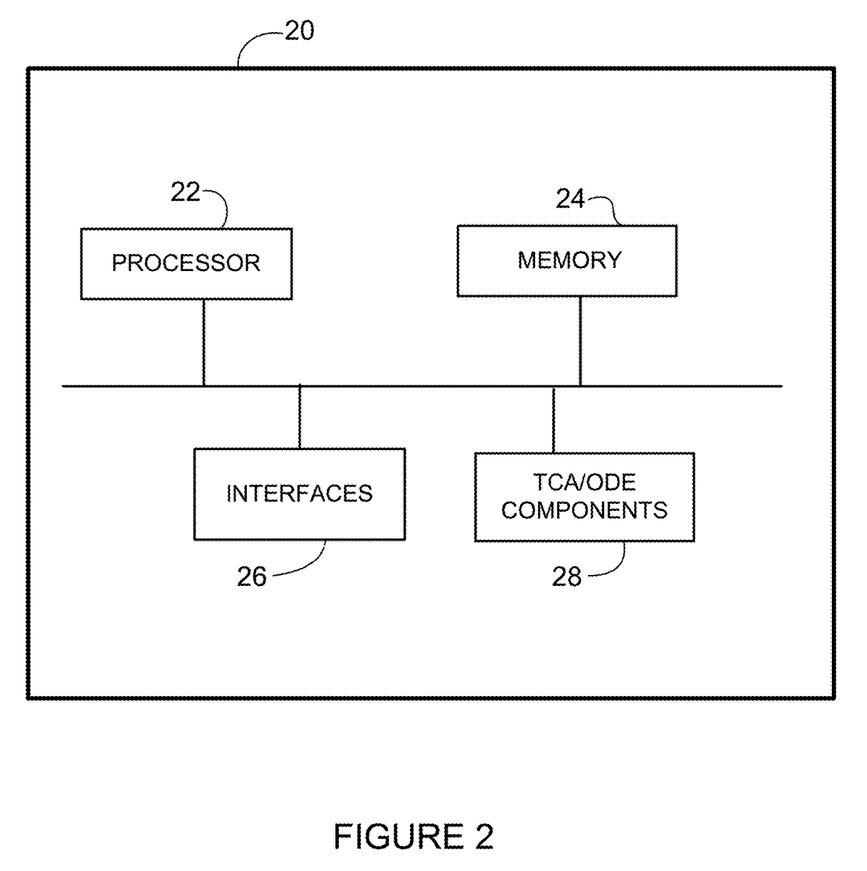
FIG. 2 depicts an example of a network device useful in implementing embodiments described herein.

FIG. 2 illustrates an example of a network device 20 (e.g., border router 14, master controller 18) that may be used to implement the embodiments described herein. In one embodiment, the network device is a programmable machine that may be implemented in hardware, software, or any combination thereof. The network device 20 includes one or more processor 22, memory 24, network interfaces 26, and TCA (Threshold Crossing Alert)/ODE (On Demand Export) components 28.

Memory 24 may be a volatile memory or non-volatile storage, which stores various applications, operating systems, modules, and data for execution and use by the processor 22. For example, one or more TCA/ODE components 28 (e.g., code, logic, database, table, etc.) may be stored in the memory 24. Memory 24 may also include a routing table (e.g., routing information base (RIB)), forwarding table (e.g., forwarding information base (FIB)), or any other data structure for use in routing or forwarding packets. Tables may also be implemented in hardware (e.g., ASIC (Application Specific Integrated Circuit)). The network device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interfaces 26 may comprise any number of interfaces (linecards, ports) for receiving data or transmitting data to other devices. The network interface 26 may include, for example, an Ethernet interface for connection to a computer or network.

The TCA/ODE components 28 may include a TCA module and an ODE module. The TCA module may be located at the destination site's border router 14 and operable to generate performance TCAs. The ODE module may also be located at the destination site's border router 14 and operable to perform an on-demand pull for the performance metrics.

It is to be understood that the network device shown in FIG. 2 and described above is only an example and that different configurations of network devices may be used. For example, the network device may further include any suitable combination of hardware, software, algorithms, processors, devices, components, or elements operable to facilitate the capabilities described herein.

Figure 3:
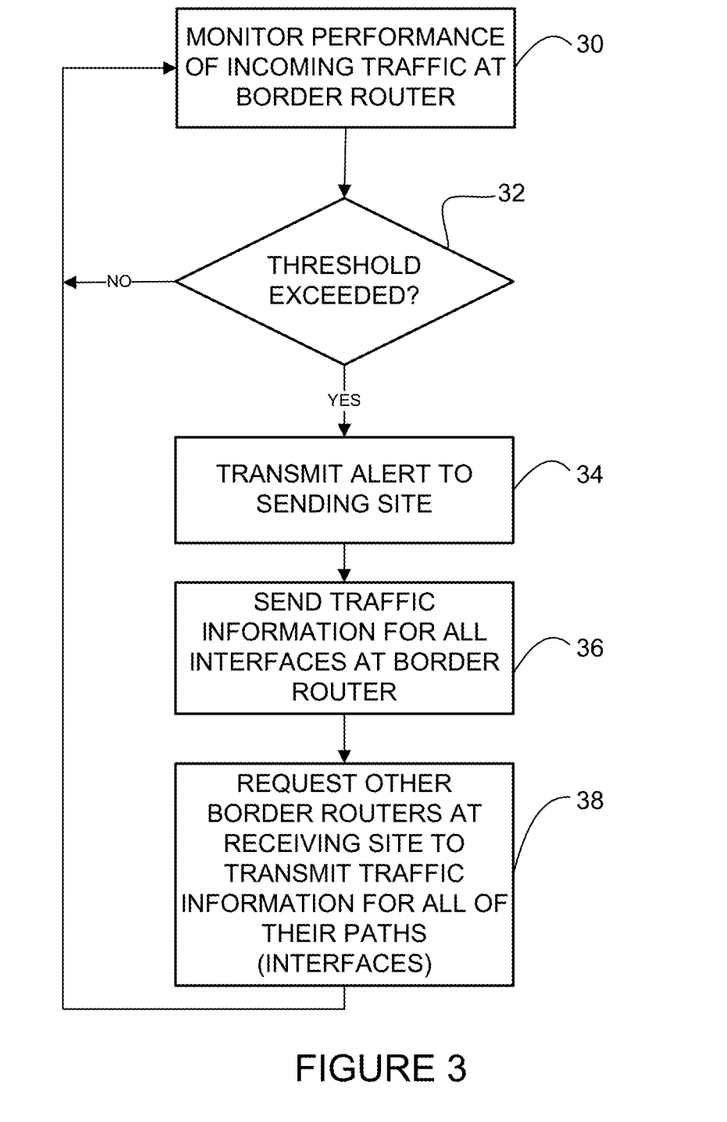
FIG. 3 is a flowchart illustrating a process at a network device for transmitting alerts and traffic information following a performance threshold violation, in accordance with one embodiment.

FIG. 3 is a flowchart illustrating an overview of a process for generating and transmitting alerts and traffic information, in accordance with one embodiment. At step 30, a network device (e.g., border router 14) monitors performance of incoming traffic. For example, in FIG. 1 site C measures the performance of incoming traffic 15 from site A at interface WAN2 over service provider Y. Data may be processed, for example, in a fixed monitor interval to determine if a particular threshold has been violated based on an aggregate performance measurement for that interval. Violation of the performance threshold may be, for example, a value that exceeds a predefined performance threshold, a value that is below a predefined performance threshold, or a value that is outside of a range of a predefined performance threshold (e.g., below lower value or above higher value of range). If the threshold is not violated, the border router 14 continues to monitor incoming traffic (step 32).

If one or more of the thresholds are violated, the border router 14 transmits an alert to the sending site (e.g., packet 17 transmitted to site A in FIG. 1) (steps 32 and 34). For each monitor interval, if one or more thresholds have been violated, the TCA module on the receiving site's border router 14, may combine all of the violations detected for that period, package these violations, and send them via a message to the sending site's master controller 18. The border router 14 may also send traffic information for all WAN interfaces at the border router (e.g., packet 17 transmitted on WAN2 interface and packets 19 transmitted on WAN1 and WAN3 interfaces in FIG. 1) (step 36). For example, the border router 14/interface 13 combination that detects the performance violation may cause an on demand export to be exported for that border router's local interfaces. Steps 34 and 36 may occur generally simultaneously. As noted above, the ODE may be transmitted in the same packet with the TCA for the interface on which the alert was raised (e.g., packet 17 in FIG. 1).

If there are additional border routers 14 at the site 10, receiving traffic from the same sender, the border router that generated the alert may also send a message to the other border routers requesting them to export traffic information for their paths (interfaces) (step 38). Thus, the receiving site's border router 14 that detected the performance violation, would not only send traffic information for the local interfaces 13 on that router, but it would also send a message to the other border routers that contain WAN interfaces, requesting the border routers to export the traffic information for those interfaces.

Figure 4:
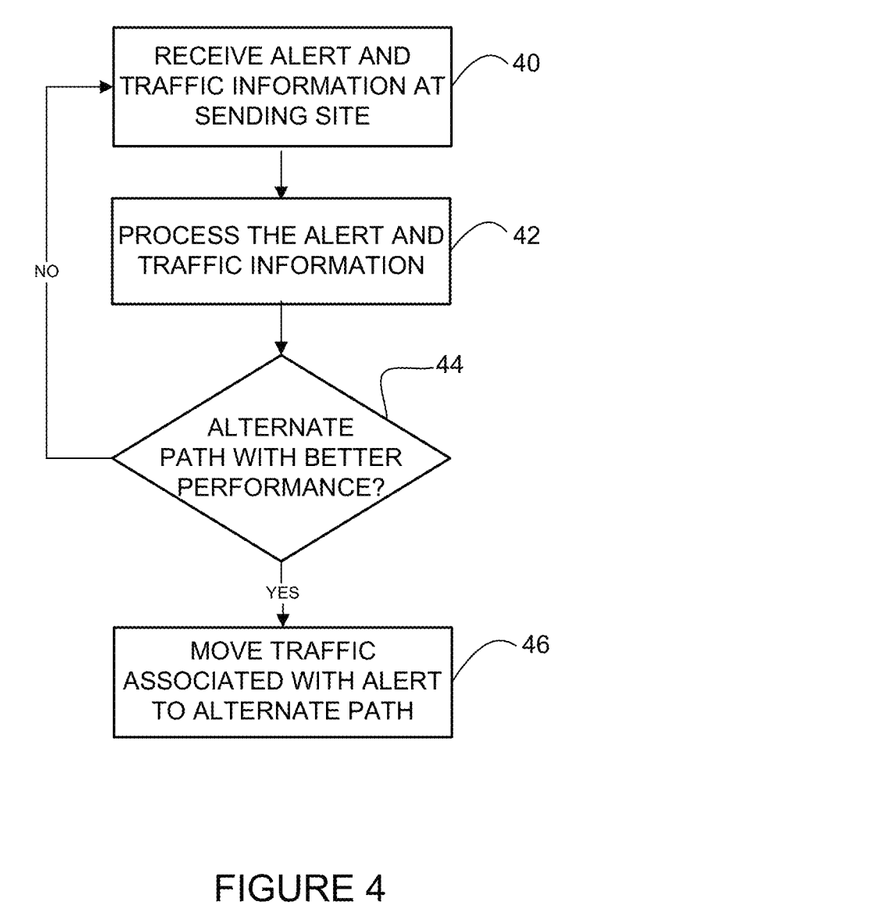
FIG. 4 is a flowchart illustrating a process at a controller for processing the alerts and traffic information, in accordance with one embodiment.

FIG. 4 is a flowchart illustrating an overview of a process for receiving and processing alerts and traffic information, in accordance with one embodiment. At step 40, an alert and traffic information is received at a network device at a sending network site (e.g., TCA and ODEs received at the master controller 18 at site A in FIG. 1). As previously described, the sending site master controller 18 may receive performance measurements for the path for which the alert was raised and all of the alternate paths at the receiving site. The MC 18 processes the alert (TCA) and traffic information (ODEs) (step 42). The processing may include, for example, identifying applications affected by the TCA (i.e., associated with the alert) and comparing performance on the current path to performance on the alternate path (or paths). If an alternate path with better performance is identified by the MC 18 based on the traffic information received, the MC may elect to reroute traffic from the path on which the TCA was received to the alternate path (steps 44 and 46). Various policies may be used in determining if the traffic should be rerouted onto an alternate path taking into account the performance measurements on the paths.

It is to be understood that the flowcharts shown in FIGS. 3 and 4 and described above are only examples and that steps may be added, combined, removed, or modified, without departing from the scope of the embodiments.

In one embodiment, passive performance monitoring may be used to measure the performance and a metric mediation agent may be used to compute any threshold violations. With the help of ingress monitors that may be activated on the interfaces 13 of the border routers 14, the application performance may be measured on the receiving side. The performance measurements may be collected on a per-site, per-DSCP, per-WAN interface (or any combination thereof) granularity. In one embodiment, all of the sites 10 are made aware of the performance policies and thresholds for a particular DSCP or application. The border routers 14 may be configured to recognize applications via endpoint signaling or DSCP marking, for example.

In one embodiment, ingress monitors are set up so that they can process data in fixed monitor intervals (e.g., 30 seconds or any other interval) and make a determination if a particular threshold has been violated based on an aggregated performance measurement for that interval. If a threshold has been violated, the metric mediation agent may notify the TCA module at the end of the monitor interval.

The generation of performance TCAs from the metric mediation agent may take place on the destination site's border router 14 that is receiving flows from various service providers 12. The destination border router 14 may passively monitor the ingress flows over the paths 13. Once the TCA has been raised on the destination site's border router 14, it is known that there has been a violation of some threshold in the incoming data from the sender site 10. The violation is communicated to the sender site 10 so that it can take corrective action for the traffic in question.

In one embodiment, the TCA notification message may be sent on a per-site, per-DSCP, per-WAN interface (or any combination thereof) basis. The message may be packaged, for example, in a NetFlow message (e.g., NFV9 (NetFlow version 9) and sent via a UDP (User Datagram Protocol) message to the sending site's master controller 18. It is to be understood that this is only an example and that other protocols may be used.

The TCA notification message may be sent to the source site's master controller 18 via all available paths 13, for reliability purposes. For example, if the receiving site has multiple WAN interfaces 13 spanning over one or more border routers 14, the TCA would be forwarded from each one of these interfaces. For additional reliability, the TCA notification packets may be marked with DSCP CS6, for example.

In one embodiment, the on demand export module may perform an on demand pull for the performance metrics for a particular WAN interface, DSCP, and site ID combination. The aggregated data may be pulled from the ingress monitor for the paths 13 for a monitor interval, packaged at the end of the monitor interval, and sent along with the TCA (e.g., packet 17 in FIG. 1) to the sending site's master controller 18 for further processing. The on demand exports may be sent via UDP messages to the sending site's master controller 18, or another protocol may be used.

In one embodiment, an application-ID such as NBAR (Network-Based Application Recognition) may be used. The NBAR ID is used to identify an application type.

As described above, the consumption of performance TCAs and ODEs may take place on source MC 18. The TCA notifications as well as the performance statistics received from the destination border router 14, may be stored under a corresponding channel (e.g., combination of <dscp, service-provider (e.g., WAN link), destination site-id>). The source site's master controller 18 may wait for a particular TCA processing delay time for the TCA notification and the on demand exports to arrive from all of the border routers 14/interfaces 13. After the timer elapses, the master controller 18 may start to process the TCA and ODEs.

The packets 17, 19 may comprise a conventional header information field, such as an IP header, source address field (originating address of packet), destination address field (target address to which packet is destined), and an alert field (for an alert packet) or export field (for on demand export packet), or both alert field and export fields.

In one embodiment, the TCA packet 17 comprises the traffic receiver's site ID, service provider, DSCP, input interface, one-way delay, RTP (Real-time Transport Protocol) inter-arrival-jitter-mean, byte loss rate, packet loss rate, unreachable, start time, or any combination of these or other data fields. One way delay, RTP inter-arrival-jitter-mean, byte loss rate, packet loss rate, and unreachable are all different metrics that may be monitored and may vary per product requirement. Start time provides an indication of the monitor interval for which these measurements are valid.

In one embodiment, the ODE packet 19 comprises the traffic receiver's site ID, service provider, DSCP, input interface, byte count, packet count, one way delay, RTP inter-arrival-jitter-mean, byte loss rate, packet loss rate, unreachable, start time, or any combination of these or other data fields. As noted above, one way delay, RTP inter-arrival-jitter-mean, byte loss rate, packet loss rate, and unreachable are all different metrics that may be monitored and may vary per product requirement. Start time provides an indication of the monitor interval for which these measurements are valid.

It is to be understood that the packet formats described above are only examples and that different packet formats or fields may be used without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   monitoring traffic at a network device located at a receiving network site in a multisite environment to determine if a performance threshold is violated, the receiving network site comprising a plurality of paths for receiving traffic from a sending network site;
   detecting a violation of a performance threshold at one of said paths at the network device;
   transmitting an alert to the sending network site in response to said violation of said performance threshold; and
   transmitting traffic information for each of said plurality of paths from the network device to the sending network site in response to said violation of said performance threshold at one of said paths;
   wherein traffic information for each of said plurality of paths is transmitted to the sending network site if said performance threshold is violated at one of said paths for use by the sending network site in determining if traffic to said path at which said performance threshold was violated should be moved to another one of said plurality of paths; and
   wherein one or more applications associated with the alert are moved to another one of said plurality of paths.

2. The method of claim 1 wherein the network device comprises a border router in communication with the sending site via at least two different service provider networks over two of said plurality of paths.

3. The method of claim 1 wherein said plurality of paths are located at a plurality of border routers, each of the border routers comprising at least one of said paths in communication with the sending site via a service provider network.

4. The method claim 1 wherein said paths comprise Wide Area Network (WAN) interfaces.

5. The method of claim 1 wherein transmitting the alert and transmitting said traffic information for said path comprises transmitting a packet comprising the alert and said traffic information for said path at which said performance threshold was violated.

6. The method of claim 1 further comprising transmitting from the network device, a message to a border router at the receiving site and in communication with the sending site, requesting the border router to transmit said traffic information to the sending network site for said paths at the border router.

7. The method of claim 1 wherein said traffic information comprises on-demand traffic information.

8. The method of claim 1 wherein monitoring traffic comprises processing data in a predefined interval to determine if said performance threshold has been violated.

9. The method of claim 1 wherein transmitting said traffic information comprises transmitting said traffic information only when said performance threshold is violated at one of said paths.

10. A method comprising:
receiving at a network device located in a sending network site in a multi-site environment, an alert that a performance threshold has been violated at a path at a receiving network site;
receiving at the network device, traffic information for a plurality of paths between the sending network site and the receiving network site, at the receiving network site in response to violation of said performance threshold; and
processing at the network device, the alert and said traffic information to determine if traffic transmitted to said path should be moved to another path in said plurality of paths, identifying one or more applications associated with the alert, and moving said one or more applications to said another path;
wherein said alert and said traffic information is transmitted from the receiving network site.

11. The method of claim 10 wherein the network device comprises a controller in communication with at least one border router at the sending network site.

12. The method of claim 10 wherein the sending network site and the receiving network site communicate via a plurality of service provider networks.

13. The method of claim 10 wherein receiving said traffic information comprises receiving said traffic information on a per-DSCP (Differentiated Services Code Point) basis.

14. The method of claim 10 wherein receiving traffic information comprises receiving an application identifier identifying an application type.

15. An apparatus comprising:
a processor for monitoring traffic at a receiving network site to determine if a performance threshold is violated, transmitting an alert to a sending network site in response to violation of said performance threshold, and transmitting traffic information to the sending network site, the apparatus located at the receiving network site; and
memory for storing said traffic information;
wherein the receiving network site comprises a plurality of paths for receiving traffic from the sending network site in a multi-site environment, said traffic information transmitted to the sending network site for said plurality of paths in response to said violation of said performance threshold for use by the sending network site in determining if traffic to said path at which said performance threshold was violated should be moved to another one of said plurality of paths, and
wherein one or more applications associated with the alert are moved to another one of said plurality of paths.

16. The apparatus of claim 15 wherein the apparatus comprises a border router in communication with the sending site via a service provider network.

17. The apparatus of claim 15 wherein the processor is further operable to transmit a message to a border router at the receiving network site and in communication with the sending site, requesting the border router to transmit said traffic information to the sending network site for said paths at the border router.

18. The apparatus of claim 15 wherein transmitting said traffic information comprises transmitting said traffic information only when said performance threshold is violated at one of said paths.

* * * * *